United States Patent
Baker et al.

(10) Patent No.: US 9,886,131 B2
(45) Date of Patent: Feb. 6, 2018

(54) DETERMINING WHAT INPUT TO ACCEPT BY A TOUCH SENSOR AFTER INTENTIONAL AND ACCIDENTAL LIFT-OFF AND SLIDE-OFF WHEN GESTURING OR PERFORMING A FUNCTION

(71) Applicant: CIRQUE CORPORATION, Salt Lake City, UT (US)

(72) Inventors: Steven H. Baker, American Fork, UT (US); Trevor C. Clifton, Lehi, UT (US); Vadim Klishko, Layton, UT (US); Daniel Byrne Kondel, Lehi, UT (US); Richard D. Woolley, Orem, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 14/985,131

(22) Filed: Dec. 30, 2015

(65) Prior Publication Data
US 2016/0117052 A1 Apr. 28, 2016

Related U.S. Application Data

(63) Continuation of application No. 14/065,048, filed on Oct. 28, 2013.

(60) Provisional application No. 61/719,218, filed on Oct. 26, 2012.

(51) Int. Cl.
*G06F 3/041* (2006.01)
*G06F 3/0488* (2013.01)
*G06F 3/044* (2006.01)

(52) U.S. Cl.
CPC ............ *G06F 3/0418* (2013.01); *G06F 3/044* (2013.01); *G06F 3/04883* (2013.01); *G06F 2203/04808* (2013.01)

(58) Field of Classification Search
CPC ...... G06F 3/041; G06F 3/0412; G06F 3/0481; G06F 3/0488; G06F 3/04886
USPC .......................... 345/173; 715/700, 863, 864
See application file for complete search history.

(56) References Cited

U.S. PATENT DOCUMENTS

| 5,327,161 | A | * | 7/1994 | Logan ................. G06F 3/03547 345/157 |
| 5,757,368 | A | | 5/1998 | Gerpheide |
| 6,424,338 | B1 | * | 7/2002 | Anderson ............. G06F 3/0213 178/18.01 |
| 6,473,069 | B1 | * | 10/2002 | Gerpheide .......... G06F 3/03547 341/27 |
| 8,610,684 | B2 | * | 12/2013 | Kalu ................... G06F 3/04883 345/173 |
| 2006/0250372 | A1 | * | 11/2006 | Lii ........................ G06F 3/0416 345/173 |
| 2008/0106523 | A1 | * | 5/2008 | Conrad ................. G06F 3/0486 345/173 |
| 2009/0090567 | A1 | | 4/2009 | Tonouchi |
| 2009/0174679 | A1 | | 7/2009 | Westerman |
| 2009/0264157 | A1 | | 10/2009 | Hsieh |
| 2011/0209099 | A1 | | 8/2011 | Hinckley |

(Continued)

*Primary Examiner* — Jason Mandeville
(74) *Attorney, Agent, or Firm* — Morriss O'Bryant Compagni Cannon, PLLC

(57) ABSTRACT

A method for determining what input should be accepted by a touch sensor after intentional and accidental lift-offs and slide-offs occur when gesturing or performing a function on the touch sensor by a finger or multiple fingers.

8 Claims, 5 Drawing Sheets

(56) References Cited

U.S. PATENT DOCUMENTS

| | | |
|---|---|---|
| 2012/0098766 A1 | 4/2012 | Dippel |
| 2012/0098769 A1* | 4/2012 | Nagasaka .......... G01C 21/3664 345/173 |
| 2012/0162091 A1* | 6/2012 | Lyons .................. G06F 3/0488 345/173 |
| 2013/0314328 A1* | 11/2013 | Singer .................. G06F 3/0488 345/173 |
| 2015/0268789 A1* | 9/2015 | Liao ...................... G06F 3/0416 345/173 |

* cited by examiner

DETERMINING WHAT INPUT TO ACCEPT BY A TOUCH SENSOR AFTER INTENTIONAL AND ACCIDENTAL LIFT-OFF AND SLIDE-OFF WHEN GESTURING OR PERFORMING A FUNCTION

BACKGROUND OF THE INVENTION

Field of the Invention

This invention relates generally to touch sensor technology. More specifically, the present invention is a system for determining what input should be accepted by a touch sensor after intentional and accidental lift-offs and slide-offs by a finger or fingers when gesturing or performing a function.

Description of Related Art

There are several designs for capacitance sensitive touchpads. It is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24. Although the CIRQUE® touchpad described above uses a grid of X and Y electrodes 12, 14 and a separate and single sense electrode 16, the sense electrode can actually be the X or Y electrodes 12, 14 by using multiplexing.

Having described a touchpad that can be modified to operate with the principles of the present invention, it is useful to understand that there are systems that already teach the recognition of a finger swipe or multiple finger swipes that enter a touch surface from the edge of a touchpad. However, these systems are not perfect in the manner in which they distinguish between intentional and accidental slide-offs and lift-offs when performing a gesture or a typical cursor function. Furthermore, the systems are inconsistent as to what input is accepted by the touchpad after these incidents occur. Accordingly, it would be an improvement to teach a new system and method for determining what input should be accepted by a touch sensor after intentional and accidental lift-offs and slide-offs.

BRIEF SUMMARY OF THE INVENTION

In a preferred embodiment, the present invention is a method for determining what input should be accepted by a touch sensor after intentional and accidental lift-offs and slide-offs occur when gesturing or performing a function on the touch sensor by a finger or multiple fingers.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow. It should also be understood that the terms "touchpad", "touchscreen", "touch sensor", "trackpad", "touch input device" and "touch sensitive device" may be used interchangeably throughout this document.

The term "gesture" generally describes motions or actions by a finger or fingers, and the term "function" generally describes the action that is performed as a result of a gesture being performed. However, a function may be the direct consequence of movement of a finger on the touch sensor without having to perform a gesture to cause an action to be performed.

The present invention is directed to the termination of a gesture or the termination of movement across a touch sensor (cursoring). The termination of a gesture or of cursoring may be intentional or accidental. The distinction is important because there are consequences. The action performed by a user following the ending of a gesture or of cursoring needs to recognized or ignored and thus resulting in input to the touch sensor or not, depending on whether or not the ending was intentional or accidental. The prior art fails to recognize this distinction, resulting in unintended consequences and faulty input to the touch sensor.

It is also important to understand that there are two distinct ways that a gesture or function may be terminated. A gesture or function may terminate with a lift-off or a slide-off. A lift-off is defined as lifting a finger off the touch sensor. A slide-off is defined as sliding a finger off an edge of the touch sensor. The present invention determines if lift-offs and slide-offs are intentional or accidental, and then provides a method for handling subsequent input to the touch sensor.

A final aspect of the invention is directed to the concept of an edge action gesture. An edge action gesture is defined as a gesture that is performed by sliding onto the touch sensor from an area immediately adjacent to any edge around the touch sensor. An edge action gesture might be accidentally performed by a user if a finger slides back onto the touch sensor after accidentally sliding off.

This document begins by addressing the scenario of terminating a gesture or function by a lift-off from a touch sensor that is capable of single finger and multi-finger detection and tracking.

Figure 1:
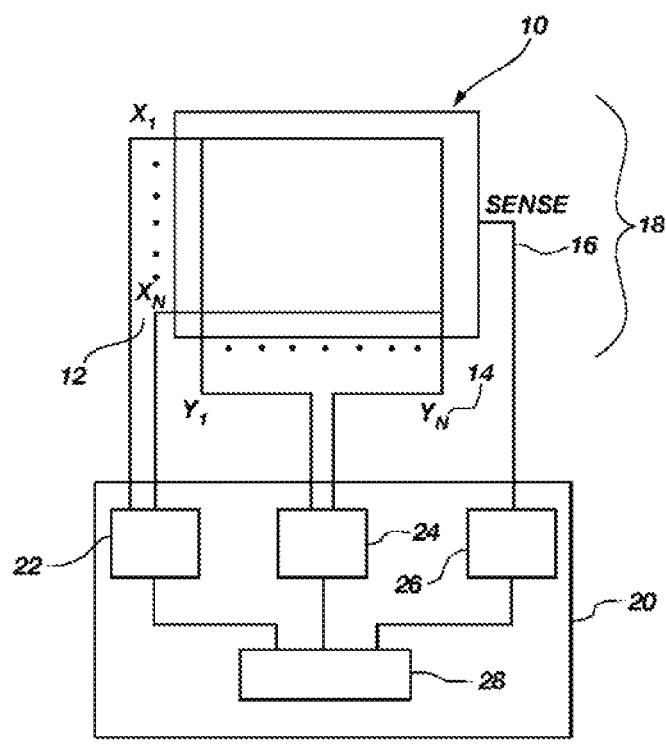
FIG. 1 is a block diagram of the components of a capacitance-sensitive touchpad as made by CIRQUE® Corporation and which can be operated in accordance with the principles of the present invention.
Figure 2:
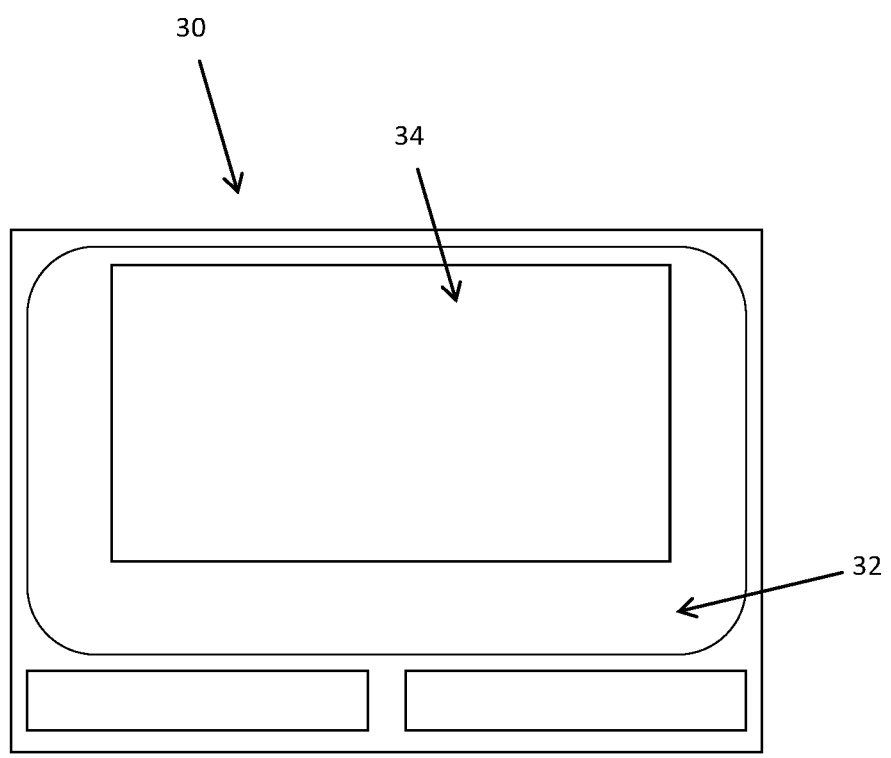
FIG. 2 is a top view of a touch sensor that shows a first zone and a second zone within the first zone.

FIG. 2 is a top view of a touch sensor 30. The touch sensor 30 includes a touch sensitive surface that may have a first zone 32 which is the entire touch sensitive surface of the touch sensor. Within the first zone 32 may be a second zone 34 that is smaller than the first zone. The exact location of the second zone 34 may be altered from what is shown and still be within the scope of the present invention. The position shown in FIG. 2 is for illustration purposes only.

In a first embodiment of the present invention, if lift-off occurs within the second zone 34, then it may be assumed that lift-off is intentional. In other words, the first embodiment assumes that all lift-offs that are away from the edges of the touch sensor 30 may be intentional. It should be realized that the second zone 34 may not be centered, but may be offset and closer to some edges than to other edges.

If lift-off is intentional because it is within the second zone 34, then any action immediately following the intentional lift-off may be recognized as valid input to the touch sensor.

Figure 3:
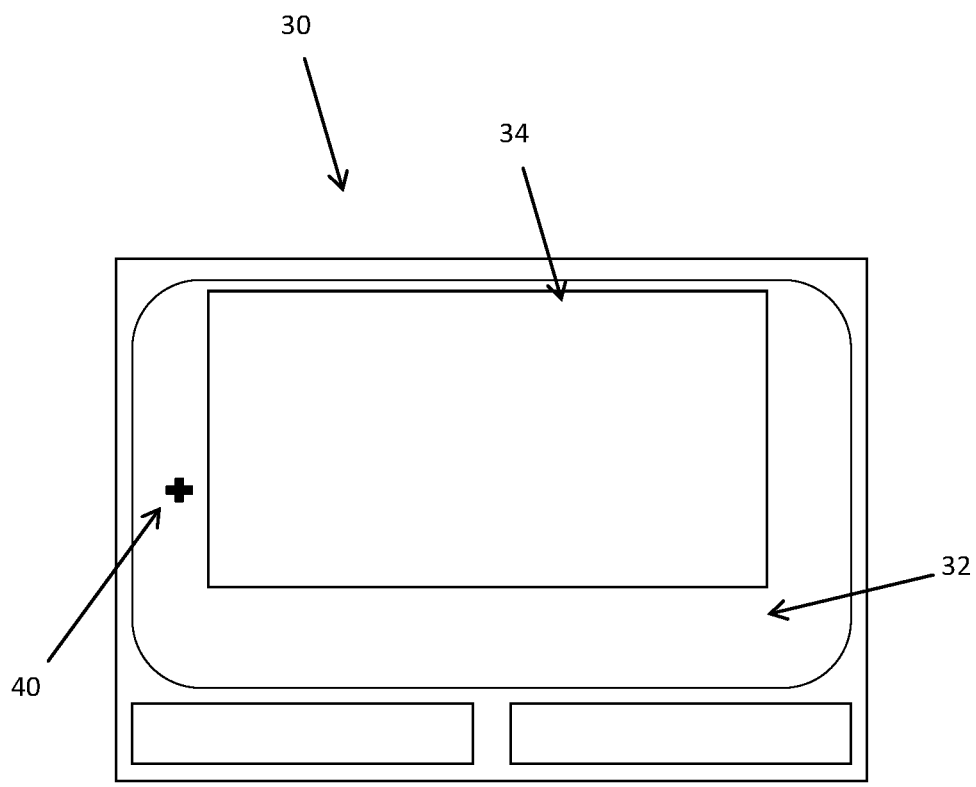
FIG. 3 is a top view of the touch sensor that shows a first action that may be interpreted as being an unintentional removal of a finger from the touch sensor.

FIG. 3 is an illustration of how the system will respond if lift-off occurs outside the second zone 34 and within the first zone 32. In this scenario the lift-off may be assumed to be accidental. In this first embodiment, if lift-off is accidental, then for a short period of time, any subsequent action will be assumed to be a continuation of the just-terminated function or gesture. However, after a certain period of time has elapsed, a subsequent action may be considered to be a new function or gesture. The first embodiment may use a countdown timer for this purpose.

Referring to FIG. 3, if the user is performing a gesture but the finger is knocked off the touch sensor outside of the second zone 34 at location 40, the gesture or function is terminated and a countdown timer begins. If the user puts the finger back anywhere on the touch sensor before the countdown timer has expired, then the terminated gesture continues as if uninterrupted. However, if the countdown timer expires before the user puts the finger back on the touch sensor, then the system may assume that a new gesture or function is now being performed. The new gesture or function may be a gesture, an edge action gesture or a function such as cursoring.

The length of the countdown timer may be adjusted if necessary to give an appropriate feel of responsiveness. The delay after an accidental lift-off should not prevent the system from accepting a new function or gesture for too long. As this delay of the countdown timer is subjective, it may be necessary to make changes depending upon the application being performed.

The size and shape of the first zone 32 and the second zone 34 may be different from the size and shape shown. The size and the shape of the zones 32, 34 may be any desired size and shape, and should not be considered to be a limitation of the present invention.

The first embodiment addresses termination of a gesture or function by lift-off, both intentional and accidental. The second embodiment is directed to the second method of terminating a gesture or function, which is by intentional or accidental slide-offs.

Figure 4:
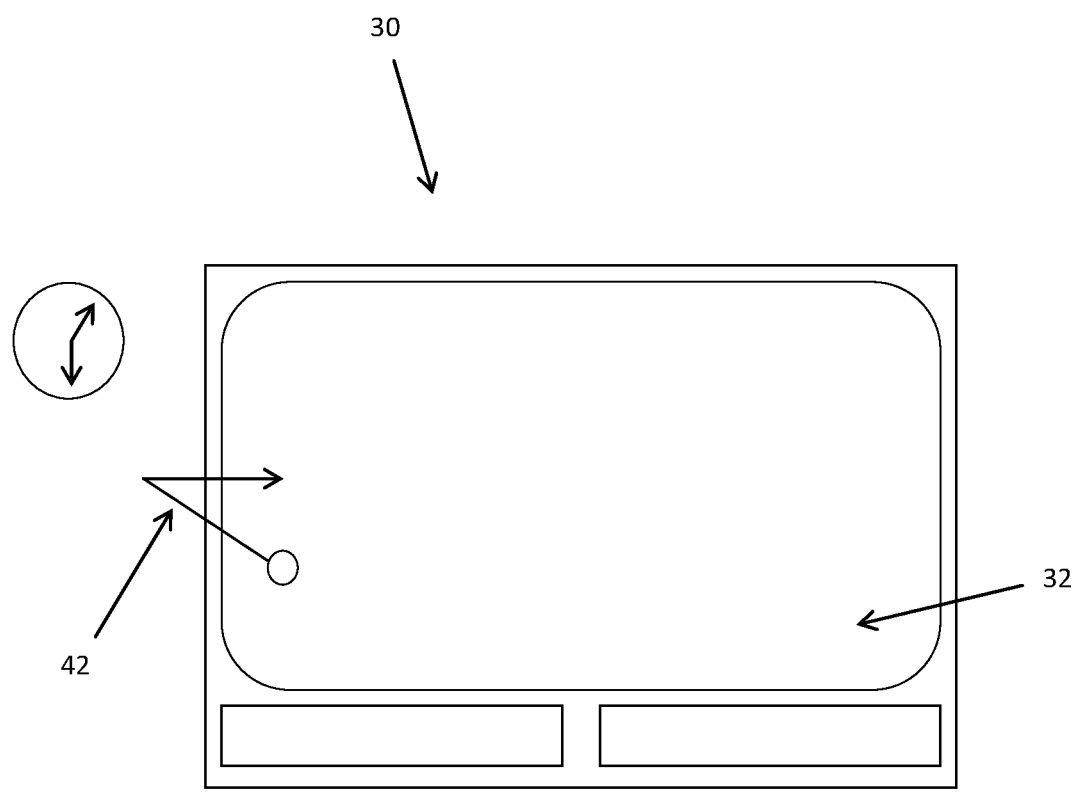
FIG. 4 is a top view of the touch sensor that shows a second action that may be interpreted as being an unintentional removal of a finger from the touch sensor.

FIG. 4 is provided as an illustration of the touch sensor 30 having a first touch zone 32. In this second embodiment, a finger is shown as making touchdown on the touch sensor 30 at location 44. The finger then slides off the touch sensor 30 as indicated by the arrow 42, and then slides back onto the touch sensor.

The second embodiment of the present invention also uses the countdown timer by starting the countdown timer when the finger slides off of the touch sensor 30.

At this point, the user may leave the finger off the touch sensor 30 until the countdown timer expires, slide the finger back onto the touch sensor as show in FIG. 4, or perform a touchdown on the touch sensor.

If the user allows the countdown timer to expire, then any subsequent action by the user may be interpreted as a new gesture or function.

If the user decides to slide the finger back onto the touch sensor 30, then other factors determine what happens. If the countdown timer has not expired, and the finger re-enters the touch sensor within a certain distance of the location of the slide-off, then the system may assume that the slide-off was accidental, and the terminated function or gesture may be continued as if it was never terminated. However, if the countdown timer has expired before the finger slides back on to the touch sensor 30, then the system may assume that a new edge gesture function is being performed.

Finally, if the user decides to instead perform touchdown on the touch sensor 30 instead of sliding back on, then the countdown timer determines what action is taken. If the countdown timer has expired, then touchdown initiates a new function or gesture. If the countdown timer has not expired, then the terminated function or gesture may be continued as if it was never terminated.

It is noted that the requirement that the finger slide back on within a certain distance of the slide-off may be made optional, and the countdown timer may be the only determining factor whether or not to accept a finger sliding back onto the touch sensor 30.

However, if the requirement is not waived, then the finger may be required to slide back on within a predetermined distance. For example, the finger might be required to slide back on the touch sensor 30 within 10 mm on either side of the slide-off location shown in FIG. 4 by arrow 46. Furthermore, the distance may be increased or decreased as desired, depending on the application.

The first and second embodiments above are directed to the situation where the location of a lift-off or slide-off occurs, the location of a slide-on, and a countdown timer are used to determine if a gesture performed immediately subsequent to a lift-off or a slide-off is ignored or recognized as valid. The third and fourth embodiments are a modification of the first and second embodiments. Specifically, more criteria re used to determine if a gesture performed immediately subsequent to a lift-off or a slide-off is ignored or recognized as valid.

Returning to FIG. 2 for the third embodiment, nothing changes if the lift-off occurs within the second zone 34. The lift-off is still determined to be intentional. However, as shown in FIG. 3, if lift-off occurs outside of the second zone 34 and within the first zone 32, then the direction of finger movement is evaluated. If the finger is moving toward the closest edge at the moment of lift-off, then the countdown timer begins. However, if the finger is not moving toward the closest edge, then any subsequent touchdown or slide-on is recognized as valid and as a new function or gesture.

Now, if the countdown timer has begun because the finger was moving towards the closest edge, and the countdown timer expires, then any function or gesture (including an edge gesture) is recognized as valid as a new function and gesture. However, if the function or gesture (including an edge gesture) begins before the countdown timer has expired, then the system determines if the function or gesture begins within a predetermined distance of the lift-off location. If the function or gesture is started within the predetermined distance of the lift-off location, then the function or gesture is recognized as invalid and is ignored.

However, if the new function or gesture begins at a location that is beyond the predetermined distance, then the function or gesture is recognized as valid.

One aspect of the third embodiment is that if the finger is moving away from the nearest edge of the touch sensor 32 or is standing relatively still at the moment of lift-off, then the countdown timer is not started, even if the finger is lifted off at the location 40.

The fourth embodiment shown in FIG. 4 is essentially the same as in the third embodiment but is evaluated with regards to a slide-off. However, the direction of travel is no longer relevant. Thus, if the finger slides off the touch sensor 32, then a countdown timer is started. If a function or gesture (including an edge gesture) is started before the countdown timer expires and the touchdown or slide-on occurs within a predetermined distance of the location of the slide-off, then the function or gesture is recognized as invalid and ignored. In contrast if the function or gesture (including an edge gesture) occurs beyond the predetermined distance, then it is recognized as valid.

The embodiments above only show a single finger being used on the touch sensor 30. In another embodiment shown in FIG. 5, three different multi-finger scenarios are illustrated.

In this fifth embodiment that introduces multiple fingers, a first finger 50 and a second finger 52 are on the touch sensor 30 at the same time. The arrows indicate that both of these fingers 50, 52 are both moved off of the touch sensor 30. The fingers 50, 52 may move off of any edge of the touch sensor 30, including different edges, and the results may be the same. The requirements for determining if a function or gesture is terminated or continues are the same as given for a single finger above in the third and fourth embodiments. Accordingly, a countdown timer must not have expired and the location of sliding back on the touch sensor may have to be near where the slide-offs occurred.

In a similar scenario, fingers 54 and 56 may leave the touch sensor 30 at different edges. To not interrupt the function or gesture being performed, the countdown timer must not have expired, and each finger 54, 56 may have to re-enter the touch sensor 30 at a location that is near the location where each finger slid off.

In another multi-finger embodiment, the finger 58 leaves the touch sensor 30 while the finger 60 does not. For the terminated function or gesture to continue, the countdown timer must not have expired, and the finger 58 must re-enter the touch sensor 30 near the location where the finger 58 slid off.

Figure 5:
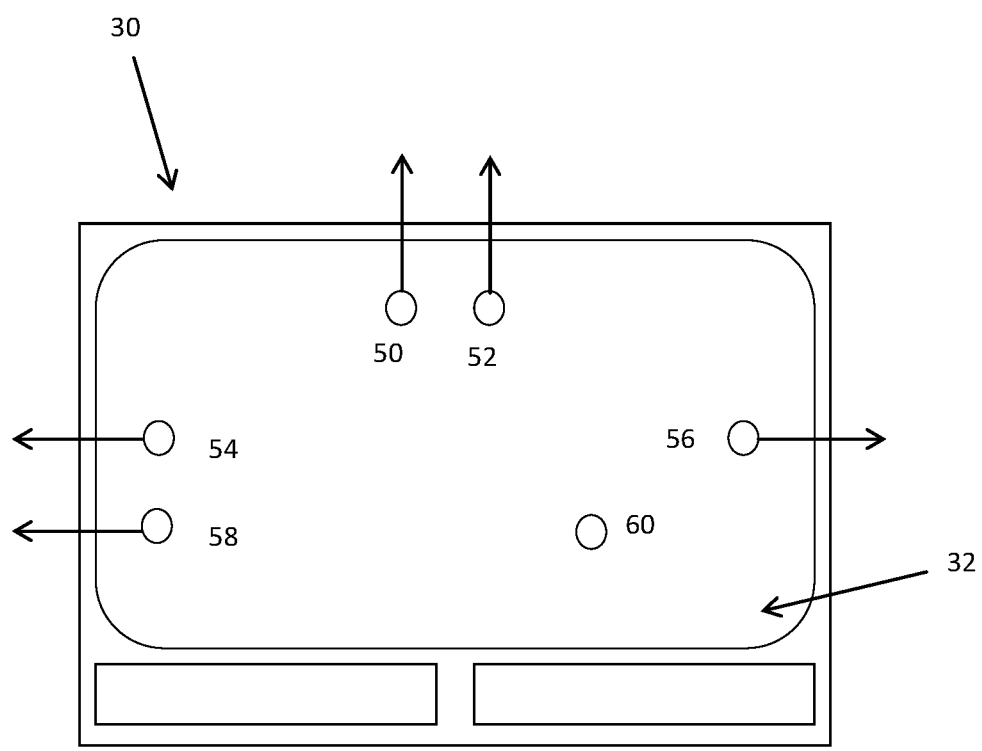
FIG. 5 is a top view of the touch sensor that shows three different multi-finger scenarios where the present invention may be applied.

A sixth embodiment may also be used for FIG. 5 that is similar to the third and fourth embodiments. In other words, if a function or gesture (including an edge gesture) are performed within a predetermined distance of the lift-off or slide-off while the countdown timer is activated, then the function or gesture is not recognized as valid. The function or gesture must be performed beyond a predetermined distance to be recognized as valid during the countdown timer.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for determining what input to accept by a first touch sensor following a finger slide-off, said method comprising:
   1) providing a first touch sensor having an edge around a perimeter thereof;
   2) performing a function or gesture with at least one finger on the first touch sensor and then detecting a finger slide-off of a finger from the first touch sensor;
   3) starting a countdown timer upon detecting the finger slide-off, the countdown timer having a predetermined length of time;

4) determining a location of the finger on the first touch sensor when the finger slide-off occurs, the finger slide-off causing a termination of the function or gesture; and 5) allowing the terminated function or gesture to continue when the finger in the finger slide-off slides back onto the first touch sensor within a predetermined distance of the location of the finger slide-off and the countdown timer has not expired, and causing the terminated function or gesture to remain terminated while allowing a new function or gesture to begin when either the finger in the finger slide-off slides back onto the first touch sensor after the countdown timer has expired or the finger in the finger slide-off slides back onto the first touch sensor at a location that is at a distance greater than the predetermined distance.

2. The method as defined in claim 1 wherein the method further comprises allowing adjustment to the predetermined length of time used by the countdown timer in order to affect sensitivity of the method.

3. The method as defined in claim 1 wherein the method further comprises allowing adjustment to the predetermined distance in order to affect sensitivity of the method.

4. A method for determining what input to accept by a first touch sensor following a finger slide-off, said method comprising:

1) providing a first touch sensor having an edge around a perimeter thereof;

2) performing a function or gesture with a plurality of fingers on the first touch sensor at a same time and then detecting a plurality of finger slide-offs of a plurality of fingers from the first touch sensor;

3) starting a countdown timer upon detecting the plurality of finger slide-offs, the countdown timer having a predetermined length of time;

4) determining a location of the plurality of fingers on the first touch sensor when the plurality of finger slide-offs occur, the finger slide-offs causing a termination of the function or gesture; and 5) allowing the terminated function or gesture to continue when the plurality of fingers in the finger slide-offs slide back onto the first touch sensor within a predetermined distance of the respective locations of the finger slide-offs and the countdown timer has not expired, and causing the terminated function or gesture to remain terminated while allowing a new function or gesture to begin when either the plurality of fingers in the finger slide-offs slide back onto the first touch sensor after the countdown timer has expired or the plurality of fingers in the finger slide-offs slide back onto the first touch sensor at respective locations that are at a distance greater than the predetermined distance.

5. The method as defined in claim 4 wherein the method further comprises allowing adjustment to the predetermined length of time used by the countdown timer in order to affect sensitivity of the method.

6. The method as defined in claim 4 wherein the method further comprises allowing adjustment to the predetermined distance in order to affect sensitivity of the method.

7. A method for determining what input to accept by a first touch sensor following a finger slide-off, said method comprising:

1) providing a first touch sensor having an edge around a perimeter thereof;

2) performing a function or gesture with a plurality of fingers on the first touch sensor at a same time, and then detecting a plurality of finger slide-offs of a plurality of fingers from the first touch sensor at opposite sides of the edge of the touch sensor;

3) starting a countdown timer upon detecting the plurality of finger slide-offs, the countdown timer having a predetermined length of time;

4) determining a location of the plurality of fingers on the first touch sensor when the plurality of finger slide-offs occur, the finger slide-offs causing a termination of the function or gesture; and 5) allowing the terminated function or gesture to continue when the plurality of fingers in the finger slide-offs slide back onto the first touch sensor within a predetermined distance of the respective locations of the finger slide-offs and the countdown timer has not expired, and causing the terminated function or gesture to remain terminated while allowing a new function or gesture to begin when either the plurality of fingers in the finger slide-offs slide back onto the first touch sensor after the countdown timer has expired or the plurality of fingers in the finger slide-offs slide back onto the first touch sensor at respective locations that are at a distance greater than the predetermined distance.

8. The method as defined in claim 7 wherein the method further comprises preventing a new function or gesture from beginning when the plurality of fingers in the finger slide-offs slide back onto the first touch sensor when the countdown timer has not expired and the plurality of fingers in the finger slide-offs are within the predetermined distance of the respective locations of the finger slide-offs.

* * * * *